United States Patent Office 3,701,638
Patented Oct. 31, 1972

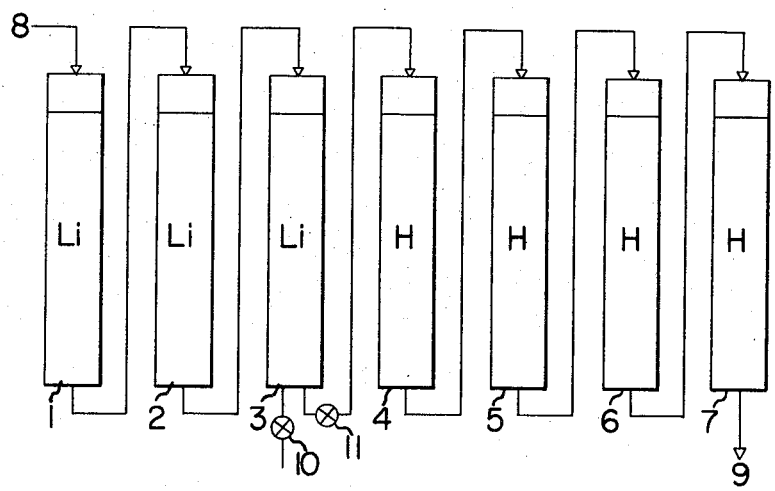
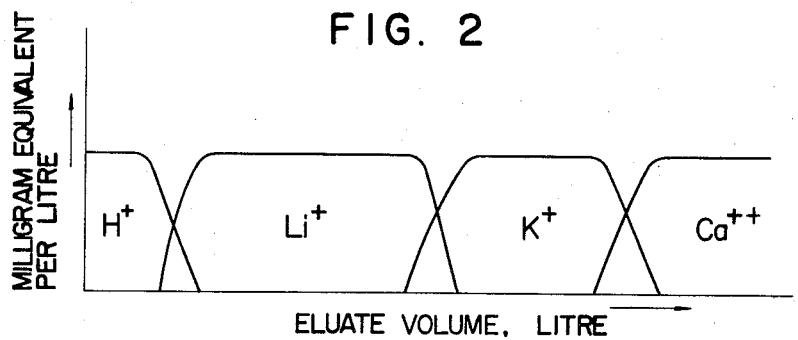
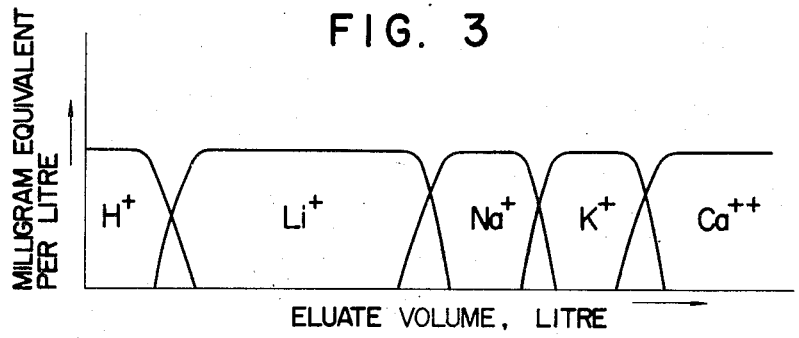

3,701,638
LITHIUM ISOTOPE SEPARATION
Zenji Hagiwara, Sendai-shi, Japan, assignor to Nippon Rensui Kabushiki Kaisha (also known as Japan Water Treatment Services Company), Tokyo-to, Japan
Filed Sept. 26, 1968, Ser. No. 762,766
Claims priority, application Japan, Oct. 2, 1967, 42/63,207
Int. Cl. B01d 11/04; C01d 1/32
U.S. Cl. 23—312
2 Claims

ABSTRACT OF THE DISCLOSURE

A solution containing lithium isotope ions is treated with at least one cation exchanger to cause adsorption of the lithium ions on the cation exchanger, which is then treated with an eluent in the form of a solution of a water-soluble compound of a metal other than lithium in a water or a polar solvent to cause elution of the lithium ions.

BACKGROUND OF THE INVENTION

This invention relates generally to the separation of lithium and more particularly to a new technique wherein lithium is separated and purified through the use of at least one ion exchanger, and/or lithium isotopes are separated and enriched.

In the separation of lithium from a naturally existing lithium ore by a chemical method, a process step for separating the lithium from other metals such as alkali metals and alkaline earth metals is necessary in the separation and purification process. Heretofore, processes such as that of purifying lithium salts with alcohols as separation solvents have been resorted to for this purpose.

On one hand, as is known, naturally existing lithium contains approximately 7.5 percent of lithium isotopes of mass number 6 (hereinafter referred to as $^6Li$) and approximately 92.5 percent of lithium isotopes of mass number 7 (hereinafter referred to as $^7Li$). While the thermal neutron absorption cross section of $^6Li$ is 945 bands that of $^7Li$ is very small. Accordingly, such differences in nuclear properties are utilized, and $^6Li$ and $^7Li$ are respectively supplied for various uses in the nuclear energy field.

Heretofore, elution chromatography in which hydrochloric acid is used as an eluent has been known as a method of separating and purifying lithium through the use of ion exchangers. Furthermore, frontal analysis is one example of known methods of enriching and separating isotopes through the use of ion exchangers.

In frontal analysis, however, isotope enrichment occurs at only one part of the frontal edge of an adsorption band. By this method, furthermore, the efficiency of the ion exchange column is very low. Accordingly, it has not been possible to develop this method beyond the laboratory scale. On the other hand, in the case of elution chromatography, the rear edge diffuses irregularly toward the frontal part of the adsorption band at which isotope enrichment occurs conspicuously, and the separation effect is poor, whereby this method cannot be advantageously utilized on an industrial scale.

As a result of my research directed toward the establishment of industrially utilisable methods for lithium separation and separation and enrichment of lithium isotopes, particularly methods in which ion exchangers are used, I have found that, in the elution of lithium ions adsorbed on a cation exchanger through the use of a specific eluent, the elution system exhibits a character resembling that of displacement chromatography, and that, as a result, separation of lithium ions from other ions can be carried out efficiently, and, at the same time, mutual separation and enrichment of lithium isotopes are possible.

SUMMARY OF THE INVENTION

It is an object of the present invention to utilise the above stated finding to provide a method for separating and purifying lithium ions from other ions through the use of ion exchangers.

The above stated object, in one aspect thereof, is to separate and enrich lithium isotope ions through the use of ion exchangers.

Other objects of the invention will become apparent as the disclosure proceeds.

According to the present invention, briefly summarised, there is provided a method for enrichment and separation of lithium isotopes through the use of ion exchangers which is characterised by the steps of treating a solution containing lithium isotope ions with at least one cation exchanger to cause the lithium ions to be adsorbed on the cation exchanger and treating the resulting cation exchanger with an eluent comprising a water-soluble compound of a metal other than lithium in water or another polar solvent thereby to cause elution of the lithium ions and thereafter transferring said eluent containing said lithium ions to a hydrogen retention bed whereby to elute said lithium ions in a manner characteristic of displacement chromatography.

The nature, principle, details, and utility of the invention will be more clearly apparent from the following detailed description beginning with general considerations and concluding with specific examples of preferred embodiment of the invention, when read in conjunction with the accompanying drawings.

BRIEF DESCRIPTION OF THE NATURE

In the drawings:

FIG. 1 is a flow chart showing apparatus comprising exchange towers suitable for use in a preferred embodiment of the invention;

FIG. 2 is a graphical representation indicating the nature of the elution system in an example of the invention;

FIG. 3 is a graphical representation similar to FIG. 2 for another example of the invention;

DETAILED DESCRIPTION

Figure 4:
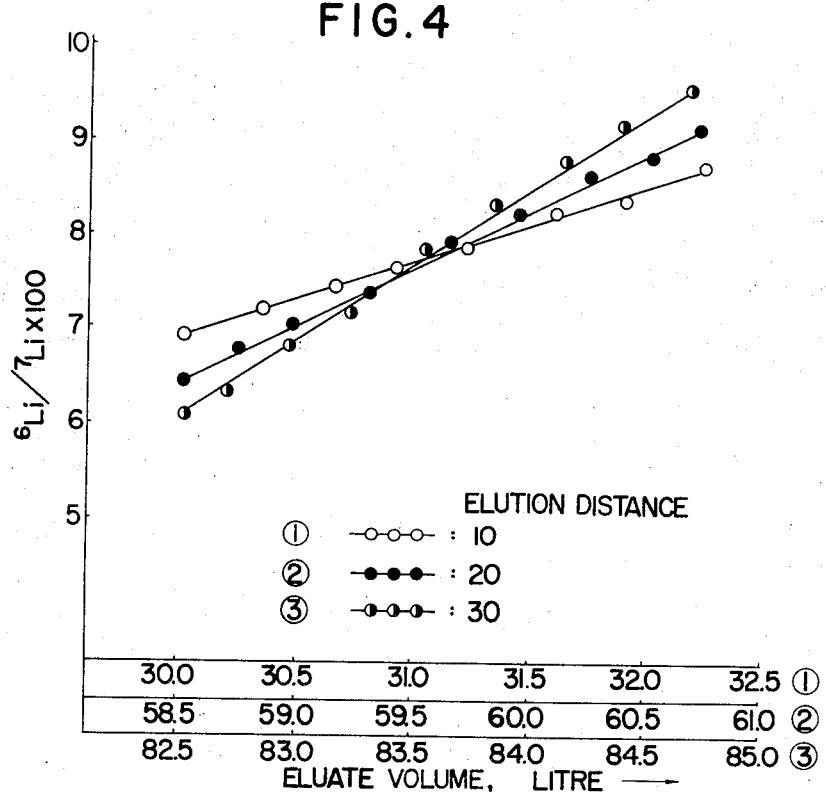
FIG. 4 is a graphical representation indicating the effect of elution distance on the variation of the ratio $^6Li/^7Li$ with eluate quantity.

In general, substances which are suitable for use as eluents in the practice of the present invention are water-soluble compounds of various metals such as, for example, alkali metals other than lithium such as sodium and potassium, alkaline earth metals such as magnesium, calcium, strontium, and barium, and other metals such as iron, aluminium, zinc, nickel, cobalt, and copper.

The term "water-soluble compounds" as herein used means compounds soluble in water and includes hydroxides of the above-mentioned various metals; salts of inorganic acids such as hydrohalogenic acid salts, nitrates, and sulphates; salts of organic acids such as formates, acetates, oxalates, citrates, and tartrates; salts of amino acids such as glycine and alanine; and water soluble chelating agents such as ethylenediaminetetraacetic acid salts, N' - hydroxyethylethylenediamine - N',N,N - triacetic acid salts.

When a compound of a monovalent metal from among these water-soluble compounds is used as an eluent, the rear edge of the lithium adsorption band tends to diffuse, and the possibility of mixing of the metal ions of the eluent and the lithium ions increases as the shifting distance of the lithium adsorption band increases since the exchange rate of lithium and a monovalent metal is relatively low. On the other hand, when a compound of a polyvalent metal is used, the rear edge of the lithium adsorption band can be maintained sharp, but regeneration requires a long time, whereby the use of such a compound is not advantageous for a recycle process.

When a compound of a divalent metal is used, however, the above mentioned disadvantages are reduced, the rear edge of the lithium adsorption band becoming sharp, whereby such a compound may be considered to be optimum as the eluent. Particularly in the case wherein the object is the separation of lithium isotopes, the enrichment of $^6Li$ can be advantageously carried out.

Furthermore, it is preferable also to select negative radicals for bonding with the metals to form water-soluble compounds in general, from among those which have a large isotope effect of $^6Li$ and $^7Li$ and to make the selection with consideration of the degree of solubility resulting from the bonding with

$\overset{+}{Li}$

Specific examples of preferable eluents are as follows: calcium acetate, barium acetate, calcium hydroxide, barium hydroxide, calcium chloride, barium chloride, magnesium chloride, and calcium and barium salts of EDTA (ethylenediaminetetraacetic acid), HEDTA (N'-hydroxyethylethylenediamine-N',N,N-triacetic acid), and NTC (nitrilotriacetic acid).

While sulphonic acid compounds of styrene-divinylbenzene copolymers, for example, strongly acidic cation exchange resins such as Diaion SK, Dowex 50W, and Amberlite IR 120, acidic cation exchange resin such as acrylic acid-divinylbenzene copolymers (e.g., Imac Z-5, Amberlite JRC 84) and methacrylic acid-divinylbenzene copolymers (e.g., Amberlite IRC-50), and inorganic cation exchangers such as zeolite can be employed for the lithium adsorption bed and the retention bed, strongly acidic cation exchange resins are ordinarily used.

The particle sizes of these exchangers are ordinarily from 20 to 400 mesh, preferably from 50 to 200 mesh. Furthermore, exchangers of degrees of cross linking of the order of from 4 to 32, in general, are used. For the aforementioned retention bed a hydrogen-type exchanger is ordinarily suitable. I have found further that a temperature in the range of from —10 to 90 degrees C. is suitable in the case of elution of lithium ions by means of an exchange column.

For carrying out separation and enrichment of $^6Li$ and $^7Li$ in the practice of the invention with high efficiency under steady-state conditions, it is desirable that the lithium adsorption band caused beforehand to be adsorbed on the exchange bed be moved at a constant speed and that conditions such as the kind of the above described eluent, the composition of the exchange bed, the elution flow velocity, and the elution temperature be carefully selected.

By the practice of the present invention, since the elution system becomes an elution chromatography resembling or approaching displacement chromatography as mentioned hereinabove, the lithium adsorption band reaches a definite length after moving through a certain distance of the exchanger layer, and there is almost no occurrence of irregular diffusion at the two edges of the lithium adsorption band. That is, by the present mode of elution, the length of the adsorption band is always constant once a steady state has been reached, irrespective of how long the distance of movement of the lithium adsorption band is. Moreover, the composition is maintained constant, and the rates of displacement reaction at the two edges of the adsorption band are very high.

Furthermore, by causing the eluent to flow at a constant velocity in the practice of the invention, $^6Li$ and $^7Li$ are steadily and positively enriched at the rear and front edges, respectively, of the adsorption band because of a difference in affinity for the exchanger due to some difference in the hydrate ionic radii of the $^6Li$ and $^7Li$ at the time when the lithium adsorption band of the inner layer of the ion exchanger reaches a state of dynamic equilibrium and moves.

For obtaining a high enrichment rate in the enrichment of lithium isotopes by the method of the invention, an ion exchange system in which, upon reaching a steady state, the actual rates of separation of $^6Li$ and $^7Li$ are high is desirable. The separation efficiency $\alpha_{eff}$ of $^6Li$ and $^7Li$ is influenced by the concentration C of the lithium solution as indicated by the following equation.

$$\alpha_{eff.} = \epsilon/(1+\beta C/q)$$

where:

$q$ is the exchange capacity of the resin;
$\beta$ is the voidage; and
$\epsilon$ is the enrichment factor.

That is, in order to obtain a high separation efficiency, it is necessary to decrease the concentration of the lithium solution undergoing elution. This lithium solution concentration is affected by the concentration of the eluent. Accordingly, the range of concentration of the eluent is highly important.

While the above equation indicates that the separation efficiency improves with decrease in the lithium solution concentration, when the reaction rate and the column efficiency are considered, the lithium solution concentration and the range of concentration of the eluent solution are automatically determined.

While the enrichment factor $\epsilon$ of the lithium isotopes in the method of the invention differs depending on the conditions of practice, it is ordinarily taken within the range of from 0.0035 to 0.0043. $\epsilon$ represents $\alpha-1$, where $\alpha$ is the separation factor and represents the ratio of $^6Li/^7Li$ existing in the resin phase to $^6Li/^7Li$ existing in the solution phase. Thus, $\alpha$ becomes from 1.0035 to 1.0043.

Furthermore, while the HETP value (height-equivalent-to-a-theoretical-plate value) representing the efficiency of the exchange column differs somewhat depending on the conditions of practice, in all cases it is within a range of small values of the order of from 0.3 to 0.8 cm., and it is possible to carry separation and enrichment of the isotopes in a desirable manner.

In an example of a preferred embodiment of the invention, exchange columns 1 through 7 filled with cation exchangers and connected in series, as illustrated in FIG. 1, are used. First, with exchange columns 1, 2, and 3, for example, connected as shown, an unpurified lithium ion solution containing various cations admixed therewith or a purified lithium ion solution is introduced through inlet 8. The liquid after the processing is discharged out through a drain pipe having a valve 10.

Example of solvents ordinarily suitable for use in the lithium ion solution in this process are polar solvents such as water, lower alcohols, lower aliphatic ketones, and mixtures thereof. Water or a mixture of water and at least one of the above mentioned polar solvents other than water is particularly suitable for use in this process.

The lithium ions introduced through inlet 8 are adsorbed in towers 1, 2, and 3, for example, in the case wherein purified ions are introduced, and are adsorbed in columns 2 and 3, for example, in the case wherein cations such as calcium and potassium are admixed therein. These exchanges columns, after being washed with a liquid such as an aqueous type solvent if necessary, are connected (by operating valves 10 and 11) to columns 4 through 7 as retention beds in an H-type state as shown in FIG. 1, and the aforementioned eluent is introduced through inlet 8 at a constant flow rate to carry out elution. In this process, a solvent similar to that of the above mentioned lithium ion solution can be used as the solvent of the eluent.

As the elution process proceeds in this manner, the impurities admixed with the unpurified lithium are progressively separated from each lithium adsorption band, and, at the same time, enrichment due to mutual separation of the isotopes of $^6Li$ and $^6Li$ is accomplished. In this process, it is possible to accomplish enrichment of the required $^6Li/^6Li$ by varying the elution distance (band length) in accordance with the length of a sample adsorption band. When the elution distance assumes a value of several tens or more, the HETP value becomes 1 cm. or less in all cases, and the exchange column efficiency becomes high.

The term "elution distance" as herein used is defined as the ratio of the distance of movement of the lithium adsorption band to the length of the lithium adsorption band.

As a result of the above described adsorption and elution process, an aqueous solution of an acid or salt flows from the retention bed and out of the final tower through an outlet 9. This solution, after suitable adjustment of its concentration, can be recirculated through the exchange columns to be further processed.

In the practice of the invention, furthermore, it is also possible to carry out separation and enrichment of isotopes in a semicontinuous manner by charging and causing adsorption of approximately the same quantity as the elution quantity of a lithium salt containing a natural proportion of isotopes at a suitable position (i.e., a position where the isoptope content thereof is close to the natural isotope proportion) of the lithium adsorption band during elution from the bottom of an exchange column of $^7Li$ and $^6Li$ enriched at the front and rear edges of the lithium adsorption band.

In order to indicate still more fully the nature and utility of the invention, the following examples of specific procedure in the practice thereof and results are set forth, it being understood that these examples are presented as illustrative only and that they are not intended to limit the scope of the invention.

EXAMPLE 1

An aqueous solution containing 1 N of LiCl and 0.3 N of KCl was caused to flow into an ion exchange column having an inner diameter of 22 mm. and filled with Diaion SKIB, 100 to 200 mesh (an acid-type, strongly-acidic, cation-exchange resin manufactured by Mitsubishi Kasei Kogyo, K.K. of Japan), and a fully suaturated adsorption band was formed and washed with water until Cl ions could not be detected.

This adsorption band was communicatively connected to an acid type (H saturated type) retention bed, and an aqueous solution of 0.05 M calcium acetate was then caused to flow therethrough, whereupon a portion at which a solution with constant Li concentration flowed out was collected. In this manner, an aqueous solution of lithium of a purity of 99.9 percent was obtained in a yield of 94 percent.

The relationship between the eluate quantity in the elution process of this example and concentrations of the various cations within the eluate at the time are indicated in FIG. 2, from which it is apparent that the elution system is of character resembling that of displacement chromatography.

EXAMPLE 2

An aqueous solution containing 1 N of LiCl, 0.2 N of NaCl, and 0.1 N of KCl was caused to flow into an ion exchange column as specified in Example 1 to form a fully saturated adsorption band, which was washed with water until Cl ions could not be detected.

Similarly as in Example 1, the adsorption band was then connected to an acid type (H saturated type) retention bed, and an aqueous solution of 0.04986 M of calcium chloride was caused to flow therethrough. A portion at which a solution with constant Li concentration flowed out was collected. As a result, an aqueous solution if lithium chloride of a purity of 99.0 percent was obtained in a yield of 95 percent.

The character of the elution system of this example, similarly as in Example 1, resembles that of displacement chromatography, as indicated in FIG. 3.

EXAMPLE 3

An aqueous solution of LiCl in which $^6Li/^7Li=7.765$ percent was caused to flow into an ion exchange tower having an inner diameter of 22 mm. and filled with Diaion SK 100, 110 to 200 mesh, (an acid-type, strongly-acidic, cation-exchange resin manufactured by Mitsubishi Kasei Kogyo, K.K., Japan) to charge Li. Washing with water was carried out until Cl ions could not be detected, and then an acid-type retention bed was connected, and an aqueous solution of 0.1 M barium acetate was supplied at flow rate of 30 cc./min., whereupon the following results were obtained.

| Eluate quantity | $C_{i\ eq.}/l.$ | $R_i$ (percent) |
|---|---|---|
| 58.6 | 0.16 | 6.63 |
| 58.8 | 0.198 | 7.09 |
| 59.1 | 0.198 | 7.49 |
| 59.6 | 0.198 | 8.13 |
| 59.9 | 0.198 | 8.23 |
| 60.5 | 0.198 | 8.58 |
| 60.8 | 0.198 | 8.93 |
| 61.0 | 0.198 | 9.20 | where:

$C_i$ is the Li concentration (mol/litre) of the ith fraction;
$R_i$ is ratio $^6Li/^7Li$ of the ith fraction; and
$R_o$ is the ratio $^6Li/^7Li$ in the lithium starting material, $R_o=7.76\%$ being actually used.

Accordingly, as a result of determining the lithium isotope enrichment factor by a break-through technique, the following result was obtained.

$$\epsilon=\alpha-1=\sum_{i=1}^{m}\frac{V_iC_i|R_o-R_i}{Q\cdot R_o}=4.2\times10^{-3}$$

where Q denotes the total exchange capacity (equivalent quantity) of the exchange tower used.

From the above table, the separation of $^6Li$ and $^7Li$ is clearly apparent.

EXAMPLE 4

The procedure as set forth in Example 3 was carried out to accomplish separation with the use of the same eluent but with different elution distances of the absorption band. As a result, the degree of variation of the ratio $^6Li/^7Li$ in the eluate was found to be influenced by the elution distance, as indicated in FIG. 4.

That is, in this example, the degree of enrichment clearly rises as the elution distance increases. However, after the reciprocal of the enrichment factor $\epsilon$ of each enrichment system, that is, $1/\epsilon$, has been reached, isotope enrichment does not occur with further increase in the elution distance.

EXAMPLE 5

The procedure of the above Example 4 was carried out with the use of magnesium chloride instead of calcium acetate for the eluent, whereupon substantially the same results as those of Example 4 were obtained.

EXAMPLE 6

The procedure of the above Example 4 was carried out with the use of barium chloride instead of calcium acetate for the eluent, whereupon substantially the same results as those of Example 4 were obtained.

EXAMPLE 7

Figure 5:
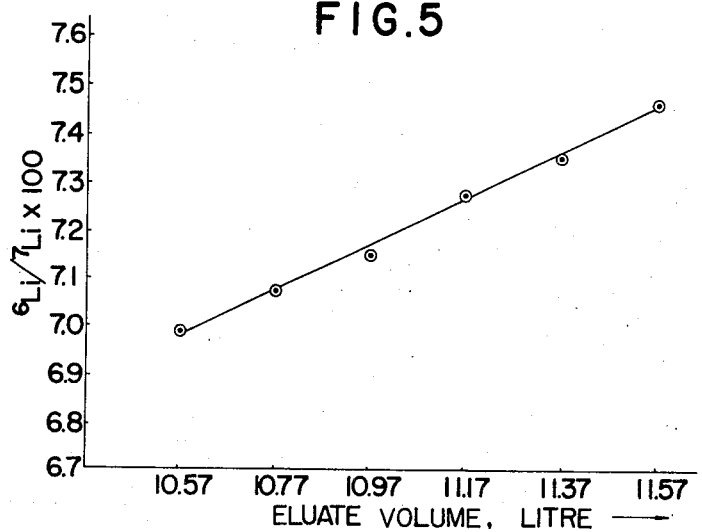
FIG. 5 is a graphical representation similar to FIG. 4 indicating the relationship between eluate quantity and isotope enrichment factor in another example of the invention.

A column having an inner diameter of 22 mm. and filled with Dowex 50W, 20 to 50 mesh (a synthetic ion-exchange resin manufactured by Dow Chemical Company, U.S.A.) was charged with Li ions by the same procedure as set forth in Example 3. Elution was carried out by supplying a solution of N' - 2 - hydroxyethylethylenediamine - N,N,N' - calcium triacetate at a flowrate of 4.0 cc./min. The resulting relationship between the eluate quantity and the isotope enrichment factor is indicated in FIG. 5.

The enrichment factor $\epsilon$ in this example was 1.003.

I claim:
1. A method of purifying or enriching lithium isotopes which comprises:
   passing an aqueous solution containing a mixture of lithium solution ions, optionally mixed with other cations, through a plurality of serially connected cation exchanger columns to cause said lithium ions and said other cations to be absorbed therein;
   eluting said ions absorbed in said cation exchanger columns into and passing through a large number of serially connected fresh cation exchanger columns by means of an eluent comprising a solution of a water soluble compound selected from the group consisting of hydroxides of metals other than lithium, salts of inorganic acids, salts of organic acids, salts of amino acids and water soluble chelating agents in water or other polar solvents to give absorption bands of the various ions;
   separating said absordption bands by further elution through said large number of exchanger columns; and
   collecting said further fractions in fractions, the lithium-isotope ions being isolated in purified fractions, enriched with respect to one or the other of the lithium isotopes of mass numbers 6 and 7 said in organic acid salt being selected from the group consisting of hydrohalogenic salts, nitrates or sulphates; said organic acid salt being selected from the group consisting of formates, acetates, oxalates, citrates and tartrates; said salts of amino acids being selected from the group consisting of glycine and alanine; said water soluble chelating agent being selected from the group consisting of ethylenediaminetetraacetic acid salts, N'-hydroxyethylethylenediamine-N',N,N-triacetic acid salts, and nitritoacetic acid salts, and said polar solvent being selected from the group consisting methanol, ethanol, propanol, butanol, acetone, and methylethyl ketone.

2. The method as claimed in claim 1 in which said metal other than lithium is a metal selected from the group consisting of sodium, potassium, magnesium, calcium, strontium, barium, iron, aluminium, zinc, nickel, cobalt, and copper.

References Cited

UNITED STATES PATENTS

| | | | |
|---|---|---|---|
| 2,148,970 | 2/1939 | Urbain | 210—30 |
| 2,204,072 | 6/1940 | Dean | 210—24 X |
| 2,653,089 | 9/1953 | Brooke | 210—38 X |
| 3,037,841 | 6/1962 | Krumholz | 210—24 X |
| 3,078,140 | 2/1963 | Hatch | 23—312 X |

FOREIGN PATENTS

| | | | |
|---|---|---|---|
| 725,660 | 3/1955 | Great Britain | 210—33 |
| 1,028,987 | 5/1966 | Great Britain | 210—30 |

OTHER REFERENCES

Nuclear Science Abstracts (ORNL–3679), vol. 19, #1, Jan. 15, 1965, p. 115.

Nucl. Sci. Abs. (Kakihana), vol. 17, #11, June 15, 1963, p. 2433.

Nucl. Sci. Abs. (Panchenkov), vol. 14, #16, Aug. 31, 1960, p. 2009.

Nucl. Sci. Abs. (Sessions), vol. 14, #24, Dec. 31, 1960, p. 3337.

Nucl. Sci. Abs. (Nikolaev), vol. 16, #17, Sept. 15, 1962, Article 22517.

Nucl. Sci. Abs. (Ciric), vol. 17, #14, July 31, 1963, p. 3123.

Nucl. Sci. Abs. (Lindner), vol. 17, #14, July 31, 1963, p. 3122.

WILBUR L. BASCOMB, JR., Primary Examiner

S. J. EMERY, Assistant Examiner

U.S. Cl. X.R.

23—89; 210—31, 38